United States Patent [19]

Roberts

[11] Patent Number: 4,983,889
[45] Date of Patent: Jan. 8, 1991

[54] DISCHARGE LAMP USING ACOUSTIC RESONANT OSCILLATIONS TO ENSURE HIGH EFFICIENCY

[75] Inventor: Victor D. Roberts, Burnt Hills, N.Y.

[73] Assignee: General Electric Company, Schenectady, N.Y.

[21] Appl. No.: 351,904

[22] Filed: May 15, 1989

[51] Int. Cl.⁵ ............................................. H05B 41/16
[52] U.S. Cl. ...................................... 315/246; 313/641
[58] Field of Search ........................ 315/246, 287, 326; 313/638, 639, 640, 641, 642

[56] References Cited

U.S. PATENT DOCUMENTS

| | | | |
|---|---|---|---|
| 4,170,746 | 10/1979 | Davenport | 315/246 |
| 4,605,881 | 8/1986 | Dakin | 313/638 |
| 4,724,361 | 2/1988 | Wada et al. | 315/246 |
| 4,783,615 | 11/1988 | Dakin | 315/248 |
| 4,810,938 | 3/1989 | Johnson et al. | 315/248 |

OTHER PUBLICATIONS

Johnson, P. D., "Control of Radial Distributions in High Intensity Discharge Lamps", U.S. patent application Ser. No. 454,255, filed 12/29/82.

Dobrusskin, A., "Review of Metal Halide Lamps", 4th International Symposium on the Science and Technology of Light Sources, Spr. 7-10, 1986, pp. 3-19.

Primary Examiner—Robert J. Pascal
Attorney, Agent, or Firm—Jill M. Breedlove; James C. Davis, Jr.; Marvin Snyder

[57] ABSTRACT

In an electroded metal halide high intensity discharge lamp, the arc is ignited and acoustic resonant oscillations are excited in the fill by a high frequency electrical power supply in order to thoroughly mix the ingredients comprising the fill. Either an amplitude modulated or a non-amplitude-modulated power supply can be used to drive the arc. The result is highly efficient straight arc operation of the lamp even in the horizontal burning position.

14 Claims, 3 Drawing Sheets

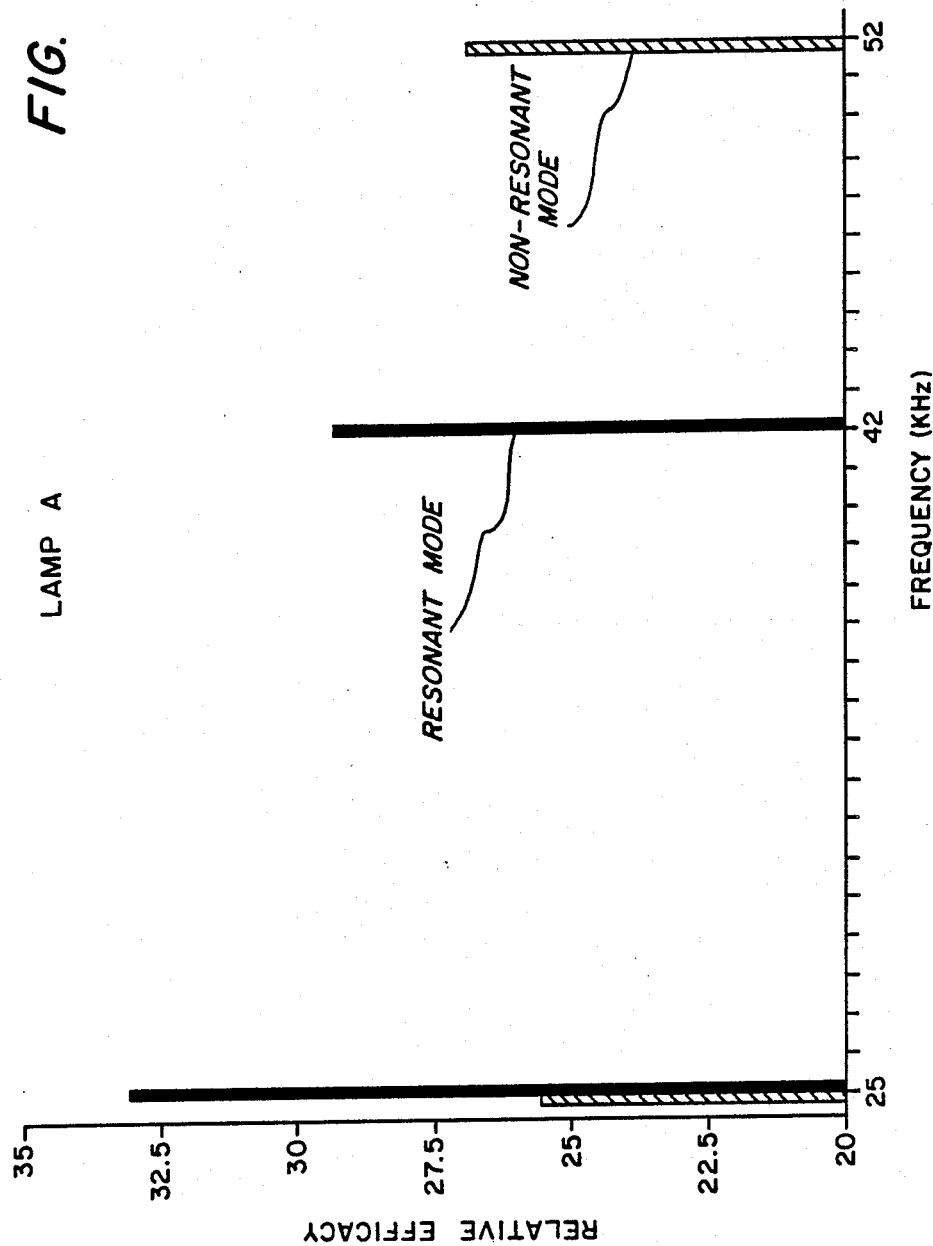

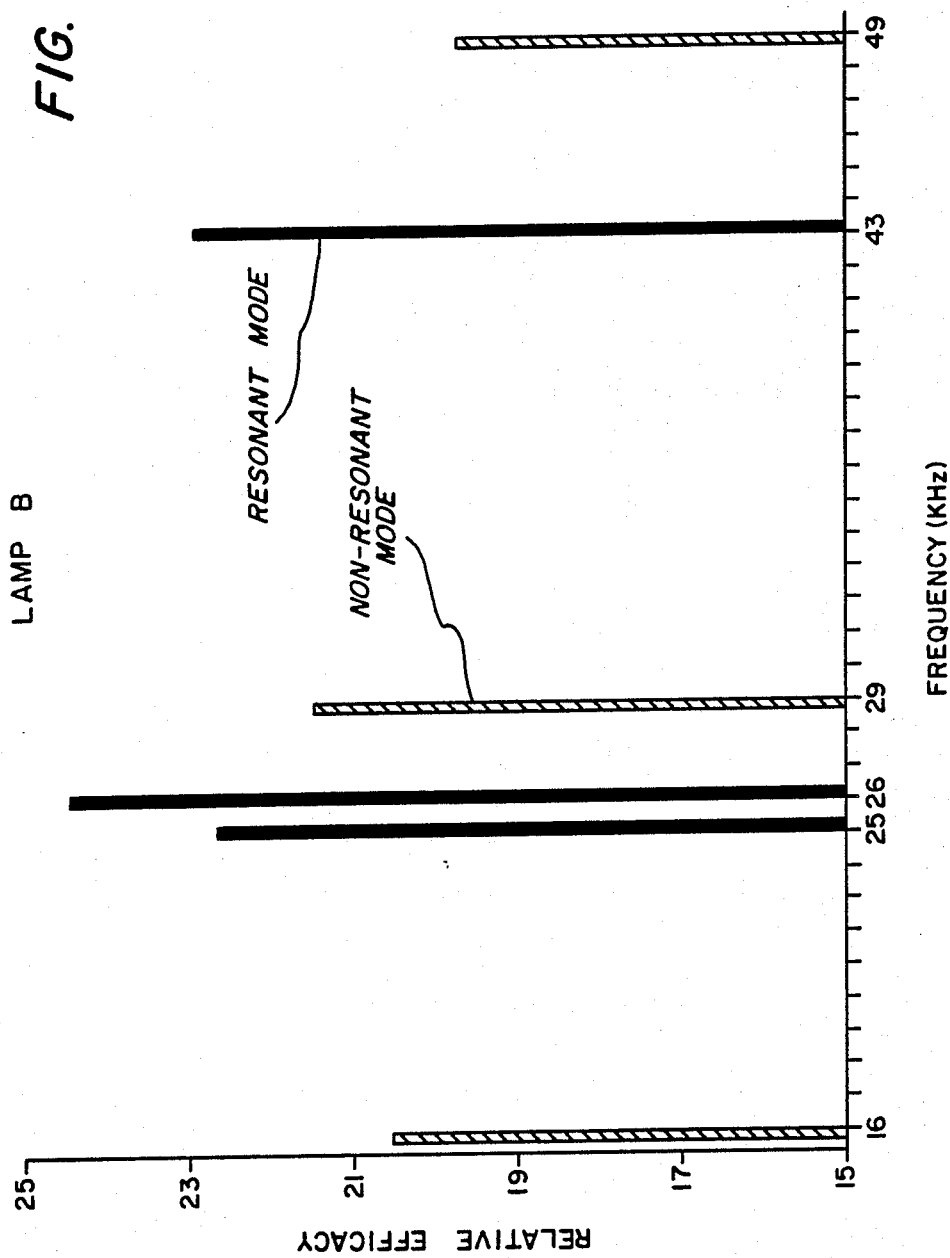

DISCHARGE LAMP USING ACOUSTIC RESONANT OSCILLATIONS TO ENSURE HIGH EFFICIENCY

FIELD OF THE INVENTION

The present invention relates generally to high intensity discharge (HID) lamps. More particularly, this invention relates to a metal halide discharge lamp which is driven at acoustic resonant frequencies in order to achieve thorough mixing of the arc tube fill ingredients, thereby resulting in highly efficient straight arc operation even in the horizontal burning position.

BACKGROUND OF THE INVENTION

The arc discharge tube of a conventional high pressure discharge lamp contains a metal which is vaporized in the plasma arc during lamp operation. In particular, in a high pressure sodium lamp, for example, it is well-known that the self-absorption characteristics of sodium atoms tend to limit lamp efficacy. That is, cooler sodium atoms existing proximate the walls of the arc discharge tube absorb some of the visible sodium D-line radiation produced within the hot central plasma region of the arc tube. One solution to this problem is described in application Ser. No. 454,225 of P. D. Johnson filed Dec. 29, 1982, now abandoned. According to this prior patent application, a predetermined amount of iodine is added to the plasma. In this way, while substantially all the sodium iodide in the central region of the plasma arc is dissociated, none of the sodium iodide near the cooler arc tube wall is dissociated. Since sodium iodide cannot absorb radiation from sodium atoms, lamp efficacy is increased. Moreover, commonly assigned U.S. Pat. No. 4,605,881, issued to J. T. Dakin on Aug. 12, 1986, teaches the addition of iodine to the discharge tube in excess of sodium iodide stoichiometry (i.e., all sodium and iodine combined) in order to eliminate free sodium near the arc tube walls when xenon is employed as a buffer gas instead of mercury vapor, which had been conventionally used, thus further improving efficacy.

Disadvantageously, however, efficacy in the aforementioned lamps is still limited in conventional long, thin arc tubes by the "de-mixing" of sodium and iodine. That is, in long, thin arc tubes, sodium remains preferentially near the arc tube walls, and iodine remains preferentially in the central region of the arc tube. A solution to the "demixing" problem would be to employ short, wide arc tubes which promote convective mixing of the sodium and iodine. However, electrode losses are a higher percentage of the total input power in a short, wide arc tube. Hence, there are competing factors in the optimization of electroded HID lamps.

These competing factors in the optimization of electroded HID lamps have led to the development of electrodeless HID lamps. An electrodeless HID lamp comprises an arc tube for containing a fill and an excitation coil coupled to a radio frequency power source; the excitation coil surrounds the arc tube for exciting a plasma arc discharge in the fill. One such lamp is disclosed in U.S. Pat. No. 4,783,615, issued to J. T. Dakin on Nov. 8, 1988 and assigned to the assignee of the present invention. This patent, which is hereby incorporated by reference, teaches the use of xenon as a buffer gas in an electrodeless sodium iodide HID lamp. Very high efficacies are achieved by using an arc tube with rounded edges and by surrounding a portion of the arc tube with quartz wool.

Another high efficiency, high intensity electrodeless discharge lamp is disclosed in U.S. Pat. No. 4,810,938 issued to P. D. Johnson, J. M. Anderson and J. T. Dakin on Mar. 7, 1989 and assigned to the assignee of the present invention. In this patent, which is hereby incorporated by reference, it is recognized that a particular combination of arc tube fill ingredients, including a sodium halide, a cerium halide and xenon, will achieve color rendition improvement without adversely affecting efficacy in these electrodeless HID lamps. Additionally, this patent presents a preferred structural configuration for further efficacy improvement.

Although such electrodeless metal halide HID lamps exhibit characteristics of high efficacy and good color, there are applications for which electroded lamp operation is advantageous. For example, at low power levels, i.e. below 200 watts, electroded HID lamps are generally more efficacious than electrodeless HID lamps. One reason is that small, low power, electrodeless HID lamps sustain high coil coupling losses. Moreover, the relative complexity and resulting high cost of the 13.56 MHz electronic ballasts generally needed to operate electrodeless HID lamps render such lamps impractical for many applications.

In another aspect of metal halide HID lamp operation, it is well-known that the discharge column of a lamp operated in the horizontal burning position is bowed, i.e., curved upwardly. Further, with regard to both horizontal and vertical operation, it is well-known that the discharge column may assume a contorted shape, which may be stable or unstable in the frequency range from approximately 20 kHz to approximately 1 MHz. Sufficiently severe instabilities can cause the discharge to extinguish. Moreover, an unstable arc may even destroy the arc tube. It has heretofore been generally accepted that these instabilities are related to the excitement of acoustic oscillations in the gas by the high frequency drive power. U.S. Pat. No. 4,170,746, issued to J. M. Davenport on Oct. 9, 1979 and assigned to the instant assignee, summarizes the theory and effects of destructive acoustic resonances. In particular, Davenport states that when commercially available metal halide HID lamps are operated in the range from 20 kHz to 50 kHz, they are subject to destructive effects of acoustics resonances. As a result, electronic ballast designs are generally limited to operating frequencies which do not excite acoustic resonant oscillations in the fill. In accordance with this theory, Davenport's invention involves miniature metal halide HID lamps operated in resonance-free regions.

In the 4th International Symposium on the Science and Technology of Light Sources, Apr. 7-10, 1986, p. 15, Alexander Dobrusskin describes advantages obtained by operating lamp ballasts at frequencies higher than 50 or 60 Hz, including increased efficacy and decreased arc bending. However, in accordance with the hereinabove described generally accepted theory of destructive acoustic resonances, he states that high pressure discharges are wasted or extinguish at frequencies which excite acoustic resonances in the plasma of the discharge. Further, he states that the difficulties in designing electronic ballasts involve selection of a suitable operating frequency and modulation of the supply voltage, i.e., elimination of supply voltage amplitude modulation.

Contrary to the above-described theory, acoustic resonant oscillations are excited in the fill of the HID lamp of the present invention by either an amplitude modulated or a non-amplitude-modulated power supply, to ensure thorough mixing of the ingredients comprising the fill, thereby resulting in high efficacy and straight arc operation even in the horizontal burning position.

OBJECTS OF THE INVENTION

Accordingly, it is an object of the present invention to provide a new and improved electroded metal halide high intensity discharge lamp which exhibits improved efficacy.

Another object of the present invention is to provide a new and improved electroded metal halide high intensity discharge lamp which exhibits improved efficacy at low power levels.

Still another object of the present invention is to provide a new and improved electroded metal halide high intensity discharge lamp which is driven at acoustic resonant frequencies to achieve thorough mixing of the fill ingredients within the arc tube which results in highly efficient straight arc operation even in the horizontal burning position.

A further object of the present invention is to provide a new and improved metal halide high intensity discharge lamp which is driven at acoustic resonant frequencies by either an amplitude modulated or a non-amplitude-modulated high frequency power supply to produce highly efficient, straight arc operation even in the horizontal burning position.

SUMMARY OF THE INVENTION

The foregoing and other objects of the present invention are achieved in a new electroded metal halide high intensity discharge lamp which is driven at acoustic resonant frequencies. The gaseous discharge medium or fill comprises a combination of one or more metal halides and a buffer material to chemically limit transport of energy from the hot core of the arc to the arc tube walls. The arc tube is coupled to a very-low to low radio frequency power source for exciting acoustic resonant oscillations of the fill gas to thoroughly mix the fill ingredients, thus resulting in a lamp of high efficacy. The lamp can be driven by either an amplitude modulated or a non-amplitude modulated radio frequency power supply. Moreover, exciting acoustic resonant oscillations in the fill produces a straight arc even when the lamp is operated in the horizontal burning position.

BRIEF DESCRIPTION OF THE DRAWINGS

The features and advantages of the present invention will become apparent from the following detailed description when read with the accompanying drawings in which:

FIG. 2 is a graph of efficacy versus frequency for a metal halide HID lamp driven at acoustic resonant frequencies and at non-resonant frequencies; and FIG. 3 is a graph of efficacy versus frequency for another metal halide HID lamp driven at acoustic resonant frequencies and at non-resonant frequencies.

DETAILED DESCRIPTION OF THE INVENTION

Figure 1:
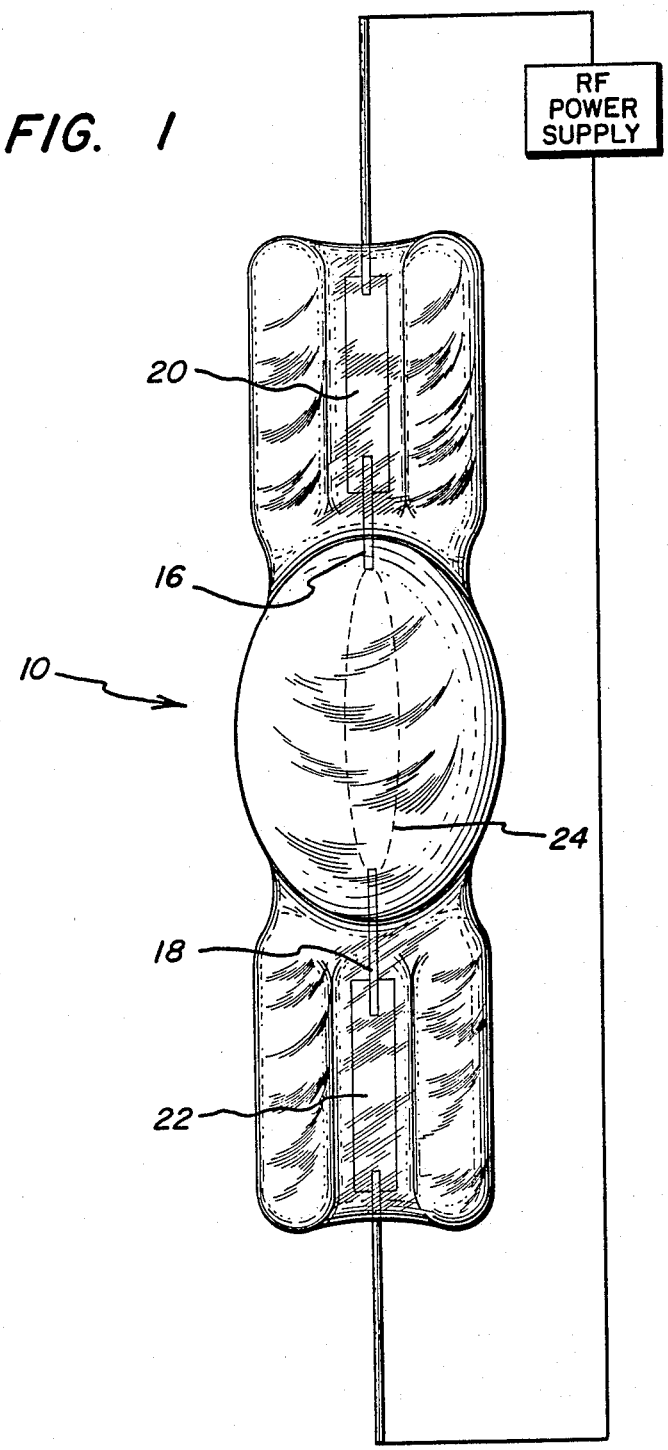
FIG. 1 is a side view of a metal halide HID lamp arc tube constructed according to the present invention.

FIG. 1 illustrates an arc tube 10 for a high efficacy, high pressure metal halide discharge lamp constructed according to the present invention. Arc tube 10 comprises a light-transmissive material, such as quartz or fused silica. The central portion of arc tube 10 is preferably elliptical. Electrodes 16 and 18, for example made of tungsten, are connected to leads 20 and 22, respectively, at opposite ends of the arc tube.

The fill enclosed by arc tube 10 comprises a combination of one or more metal halides and a buffer in a sufficient quantity to chemically limit the transport of energy from the hot core of the arc to the walls of the arc tube. Under certain conditions, a starting gas is also added. Suitable metal halides are: sodium iodide, scandium iodide, thallium iodide, lithium iodide, indium iodide, zinc iodide, lanthanum iodide and cerium chloride. An inert gas, such as xenon or krypton, may comprise a suitable buffer. However, mercury vapor is preferably used as the buffer because use of mercury results in an increased arc voltage drop, thereby decreasing electrode losses. Since the vapor pressure of mercury is very low at room temperature, starting gas is used when mercury is employed as the buffer. As an example, a suitable fill comprises a combination of sodium iodide, scandium iodide, mercury vapor, and a starting gas such as argon.

In operation, arc tube 10 is coupled to a high frequency electrical power supply 12 which provides very-low to low radio frequency (RF) energy for igniting an arc and exciting acoustic oscillations of the fill. Driving the arc at acoustic resonant frequencies results in gross movement of the gaseous fill within the arc tube. Such motion results in thorough mixing of the fill ingredients, thereby decreasing the number, if any, of free metal atoms near the wall of the arc tube which absorb visible radiation from the core of the discharge. Hence, lamp efficacy is increased. Advantageously, a stable straight arc 24 in both the horizontal and vertical burning positions is likewise achieved by exciting acoustic resonant oscillations in the fill. Thorough mixing of the fill ingredients may be enhanced further by ensuring an arc tube aspect ratio (i.e., length/diameter) in the range from 0.5 to 5.0.

The preferred frequency range of operation is from 20 kHz to 100 kHz, the frequency range where acoustic oscillations are easily excited and for which simple, low-cost power supplies can be used. Within this frequency range, however, high-efficiency straight arc operation can be achieved only in specific narrow resonant frequency bands which depend upon the particular structure and fill of the lamp.

The following example demonstrates that metal halide HID lamps driven at acoustic resonant frequencies to achieve straight arcs in the horizontal burning position exhibit higher efficacy operation than lamps driven at conventional non-resonant frequencies which have bowed arcs.

EXAMPLE

Two elliptical lamps, A and B, were tested, each having a minor diameter of 6 millimeters and a major diameter of 9 millimeters and a fill comprising: 5 milligrams total of sodium iodide and scandium iodide with a specific composition of 95 mole % NaI and 5 mole % $ScI_3$; a 4 milligram mercury amalgam composed of 98 mole % mercury and 2 mole % cadmium; and 120 Torr partial pressure of argon as a starting gas. Each lamp was placed horizontally in an integrating sphere and operated at 25 watts with an ENI Model 1140LA variable frequency amplifier. To facilitate operation over a wide range of frequencies, each lamp was connected to the amplifier through a matching transformer and a 500 Ω resistor. The operating frequency was varied from approximately 15 KHz to 65 KHz, including resonant and non-resonant frequencies. Light output was measured with an eye sensitivity corrected silicon photodiode, model PIN-10AP, manufactured by United Detector Technology, Inc. Data was taken at frequencies for which the arc was stable. At non-resonant frequencies (indicated by the cross-hatched bars), the arc was bowed, as expected. In narrow acoustic resonant frequency bands (indicated by solid bars), efficacy increased and the arc assumed a straight appearance. FIGS. 2 and 3 illustrate the efficacies of lamps A and B, respectively, in the resonant and non-resonant modes of operation.

While the preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

What is claimed is:

1. A low-pressure metal halide high intensity discharge lamp, comprising:
   a light transmissive arc tube for containing an arc discharge, said arc tube having electrodes at opposite ends thereof;
   a fill disposed in said arc tube, said fill including at least one metal halide, the metal being selected from the group consisting of sodium, scandium, thallium, lithium, indium, zinc, lanthanum, cerium and mixtures thereof, the halide being selected from the group consisting of bromides, chlorides, iodides and mixtures thereof;
   said fill further including a buffer gas selected from the group consisting of xenon, krypton, and mercury vapor, said buffer gas being present in sufficient quantity to limit chemical transport of energy from said arc discharge to the walls of said arc tube;
   a radio frequency electrical power source; and
   means connected to said electrodes for coupling said radio frequency electrical power source to said fill for exciting acoustic resonant oscillations therein, said acoustic resonant oscillations producing a substantially uniform mixture of the ingredients comprising said fill, thereby producing an efficient and substantially straight arc discharge within said arc tube.

2. The lamp of claim 1 wherein said fill comprises a second metal halide, said one and said second metal halides comprising sodium iodide and scandium iodide.

3. The lamp of claim 1 wherein said buffer gas comprises mercury vapor.

4. The lamp of claim 2 wherein said buffer gas comprises mercury vapor.

5. The lamp of claim 1 wherein said power source operates at a frequency selected in the range between approximately 20 KHz and approximately 100 kHz to excite acoustic resonant oscillations in said fill.

6. The lamp of claim 3 wherein said power source operates at a frequency selected in the range between approximately 20 KHz and approximately 100 kHz to excite acoustic resonant oscillations in said fill.

7. The lamp of claim 4 wherein said power source operates at a frequency selected in the range between approximately 20 KHz and approximately 100 kHz to excite acoustic resonant oscillations in said fill.

8. The lamp of claim 1 wherein said arc tube is substantially elliptical.

9. The lamp of claim 8 wherein said arc tube is selected to have an aspect ratio in the range of from 0.5 to 5.0.

10. A method of operating a low pressure electroded metal halide arc lamp having a fill enclosed by an arc tube, which method comprises igniting an arc within said fill by exciting said fill with acoustic oscillations at a resonant frequency for said arc tube, said acoustic oscillations at the resonant frequency producing a substantially uniform mixing of the ingredients comprising said fill so that efficacy is improved and said arc is substantially straight within said arc tube.

11. The method of claim 10 wherein said fill includes at least one metal halide, the metal being selected from the group consisting of sodium, scandium, thallium, lithium, indium, zinc, lanthanum, cerium and mixtures thereof, the halide being selected from the group consisting of bromides, chlorides, iodides and mixtures thereof;
    said fill further including a buffer gas selected from the group consisting of xenon, krypton, and mercury vapor, said buffer gas being present in sufficient quantity to limit chemical transport of energy from said arc discharge to the walls of said arc tube.

12. The method of claim 11 wherein said fill comprises a second metal halide, said one and said second metal halides comprising sodium iodide and scandium iodide.

13. The method of claim 11 wherein said buffer gas comprises mercury vapor.

14. The method of claim 12 wherein said buffer gas comprises mercury vapor.

* * * * *

UNITED STATES PATENT AND TRADEMARK OFFICE
CERTIFICATE OF CORRECTION

PATENT NO. : 4,983,889
DATED : Jan. 8, 1991
INVENTOR(S) : Victor D. Roberts

It is certified that error appears in the above-indentified patent and that said Letters Patent is hereby corrected as shown below:

Column 5, claim 1, line 52, between "A: and before "metal halide", delete "low-pressure".
Column 6, claim 10, line 27, before "electroded", delete "low" and substitute —high—therefor.

Signed and Sealed this

Nineteenth Day of September, 1995

Attest:

BRUCE LEHMAN

*Attesting Officer*     *Commissioner of Patents and Trademarks*